Figure 5:
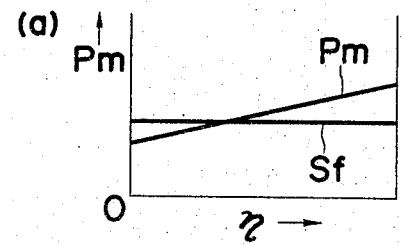
Figure 5:
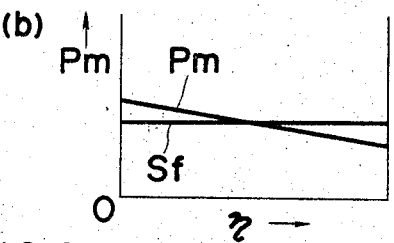
Figure 5:
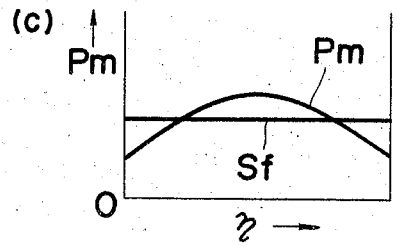
Figure 5:
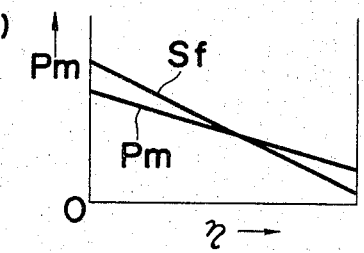

United States Patent [19]
Kiyohara et al.

[11] 3,731,049
[45] May 1, 1973

[54] CONTROL APPARATUS FOR SHORT-CIRCUIT ARC WELDING

[75] Inventors: Michiya Kiyohara; Hisao Goto, Higashiyodogawa-ku, Osaka, Japan

[73] Assignee: Osaka Transformer Co., Ltd., Osaka-shi, Osaka-fu, Japan

[22] Filed: Sept. 27, 1971

[21] Appl. No.: 183,797

Related U.S. Application Data

[63] Continuation-in-part of Ser. No. 856,697, Sept. 10, 1969, abandoned.

[30] Foreign Application Priority Data

Sept. 16, 1968 Japan..................................43/66123

[52] U.S. Cl. ..............................219/131 F, 219/137
[51] Int. Cl. ..............................................B23k 9/10
[58] Field of Search................219/137, 135, 131, 219/130, 74; 314/62, 75

[56] References Cited

UNITED STATES PATENTS

| | | | |
|---|---|---|---|
| 3,250,894 | 5/1966 | Manz | 219/131 |
| 3,125,671 | 3/1964 | Manz | 219/131 |
| 3,546,423 | 12/1970 | Chopp | 219/130 |
| 3,109,121 | 10/1963 | Heeney, Jr. | 219/130 |
| 2,026,943 | 1/1936 | Kennedy et al | 219/137 |
| 2,636,102 | 4/1953 | Lobosco | 219/131 F |

*Primary Examiner*—J. V. Truhe
*Assistant Examiner*—George A. Montanye
*Attorney*—Craig, Antonelli & Hill

[57] ABSTRACT

An apparatus for controlling the feeding of the welding electrode in short circuit metal transfer arc welding which employs a feeding speed detecting circuit. The feeding speed varies according to variations in the period of shortcircuiting between the electrode and the workpiece and the time during which a welding arc is generated.

2 Claims, 10 Drawing Figures

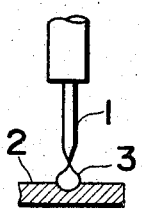
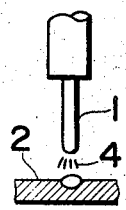
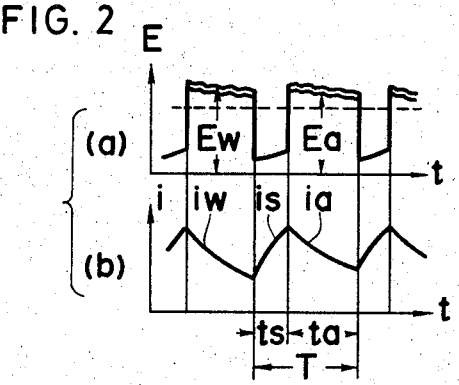
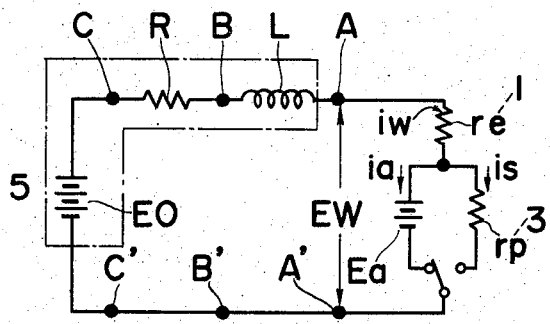
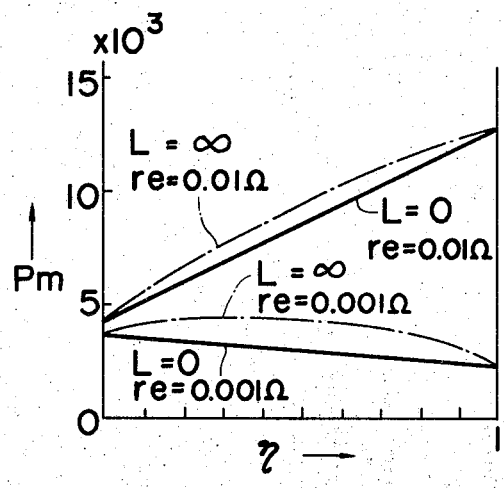

CONTROL APPARATUS FOR SHORT-CIRCUIT ARC WELDING

This is continuation-in-part application of the U.S. Pat. Application, Ser. No. 856,697, filed on Sept. 10, 1969 and now abandoned.

The present invention relates to a control method and apparatus to be used for shortcircuit metal transfer arc welding in which the welding electrode feeding speed can be continuously controlled during the progress of the welding work. More particularly, the present invention refers to an improved method of welding control so that, during a fully automatic or semi-automatic shortcircuit metal transfer arc welding process which employs a welding power source having a substantially constant potential characteristic, the feeding speed of the welding electrode wire may be controlled in direct compliance with the fusing degree of the electrode wire throughout the duration of the welding.

In the present invention, therefore, an improved method of controlling is provided, which is entirely different from the conventional control method in which the welding power is ordinarily supplied from the welding power source which has a substantially constant potential characteristic and the welding electrode wire is fed at a fixed speed, that is, solely dependent on the self-controllability derived from the welding power source itself.

In a conventional shortcircuit metal transfer arc welding process and in the ordinary consumable electrode arc welding operation, it is common practice to feed the welding electrode wire at a fixed speed and the output current is either increased or decreased entirely dependent upon the self-controllability based on the welding power source itself to thereby maintain a proper relationship between the electrode feeding speed and the electrode melting speed. However, in such a control system, the influence of variations in the length of the welding electrode portion which extends from the nozzle, which serves to deliver power and guide the current toward the weld zone, is completely ignored and, therefore, such a control system is not dependably accurate.

Examinations of the factors of the shortcircuit metal transfer arc welding are to be made hereunder with reference to certain figures of the accompanying drawing in which:

FIGS. 1 (a) and 1(b) are both schematic diagrams respectively showing the sequence of drop growth and the detachment of the drop in short-circuit metal transfer arc welding, FIGS. 2 (a) and 2 (b) are graphs showing the voltage waveform and current waveform developed between the welding electrode and the object to be welded during shortcircui metal transfer arc welding, respectively, FIG. 3 is a generalized equivalent circuit diagram used for shortcircuit metal transfer arc welding, and FIG. 4 and FIGS. 5 (a) to 5 (d) are graphs showing the relation between the energy which melts the welding electrode wire and the shortcircuiting time ratio, in shortcircuit metal transfer arc welding.

Generally, in the shortcircuit metal transfer arc welding, as is shown in FIG. 1 (b), when an arc 4 is generated between the consumable electrode 1 and the object to be welded 2, the electrode 1 and the object 2 to be welded will be fused due to the heat of the arc, and one part of the melted electrode 1 becomes a globule (droplet), which is transferred to the molten pool 3 of the object 2 to be welded (i.e., the base metal), and thus the electrode 1 and the object 2 are shortcircuited, as illustrated in FIG. 1 (a). When the droplet-transferring has ended, there will be generated once again an arc 4 between the electrode and the object 2 to be welded, as shown in FIG. 1 (b). This alternation of shortcircuiting and arc-on is then repeated at a definite cycle, as the welding proceeds. Accordingly, the voltage waveform E and the current waveform developed in cycles between the electrode and the base metal during the welding operation can be plotted, with the abscissa representing the time $t$, as shown in FIGS. 2 (a) and (b), respectively.

To understand the respective designations of the symbols in the above figures, $Ew$ is the voltage present between the electrode and the base metal; $Ea$ represents the arc voltage, $i_w$ is the welding current; $i_a$ denotes the current flowing at the time of arc-on; $i_s$ is the current flowing at the shortcircuiting time; $t_s$ stands for the shortcircuiting time; $t_a$ is the arc-on time; and T represents the repeating cycle of shortcircuiting. An equivalent circuit for producing shortcircuit metal transfer arc welding is shown in FIG. 3. In this figure, $Eo$ represents the no-load (open circuit) voltage of welding power source 5, L represents the total inductance of such elements as the welding power source, welding cable, resistance and reactances and R represents the total resistance of these elements. Also $r_e$ is the equivalent resistance value at the extended portion of the welding electrode tip as exemplified in FIG. 1; while $r_p$ denotes the equivalent resistance of the molten pool 3 at the time of shortcircuiting.

Let us examine the electrical energy $Pm$ which is to fuse the welding electrode during shortcircuit metal transfer arc welding, wherein it is assumed that $r_p = 0$ for simplification, then two energy requirements must be considered, i.e., the energy $Pa$ due to the arc current and the energy $Pr$ of resistance heating which takes place at the extended portion of the electrode wire 1 during shortcircuiting period and the arc-on period. Those energies can be expressed in the forms of the following formulas based on the equivalent circuit shown in FIG. 3.

The energy $Pa$ based on the arc current is:

$$Pa = \frac{1}{T} \int_0^{T(1-\eta)} E_M \cdot i_a \cdot dt = \frac{E_M}{T} \int_0^{T(1-\eta)} i_a \cdot dt \quad (1)$$

The heat resistance-heating energy at the extended portion of the electrode, $Pr$, is:

$$Pr = \frac{1}{T} \int_0^{T\eta} r_e \cdot i_s^2 \cdot dt + \frac{1}{T} \int_0^{T(1-\eta)} r_e \cdot i_a^2 \cdot dt$$

$$= \frac{r_e}{T} \left( \int_0^{T\eta} i_s^2 \cdot dt + \int_0^{T(1-\eta)} i_a^2 \cdot dt \right) \quad (2)$$

Accordingly, the energy $Pm$ for causing the electrode to melt is:

$$Pm = Pa + Pr = \frac{E_M}{T} \int_0^{T(1-\eta)} i_a \cdot dt$$

$$+ \frac{r_e}{T} \int_0^{T\eta} i_s^2 \cdot dt + \int_0^{T(1-\eta)} i_a^2 \cdot dt \quad (3)$$

It is to be noted that $E_M$ in the above formula stands for the equivalent voltage of melting energy of the arc, while $\eta = t_s/T$, that is, the shortcircuit time ratio.

As will be clearly understood from the formula (3) above, the energy $Pm$ which causes the electrode wire to melt can be expressed in terms of the function of $Eo$, $Ea$, L, R, $r_e$ and $\eta$, as shown in the following equation.

$Pm = f(Eo, Ea, L, R, r_e, \eta)$

Among the six factors described above, those that change during the welding operation are four in number, i.e., $Eo$, $Ea$, $r_e$ and $\eta$. In determining the conditions which make it possible to maintain a stabilized cyclic repetition of the shortcircuiting and arcing in the shortcircuit metal transfer arc welding, a further examination of the said four factors will be made. In the first place, the variation of the no-load voltage $Eo$ of the welding power source is caused by the variation of the primary input voltage of the welding power source; and in the second place, the arc voltage $Ea$ (in the case of shortcircuit metal transfer arc welding) does not vary as much as the arc voltage of a conventional arc. The reason for this is that the arc-length, at the moment when the shortcircuiting has been broken off and the next arc has been ignited, is substantially constant. In the third place, the variation of the resistance $r_e$ at the electrode extension portion might be regarded as unavoidable. Especially, in the case of semi-automatic welding practice in which the means for guiding the electrode wire and feeding the current to the electrode wire is held and manipulated by hand, it is impossible to fix the gap between the wire tip and the object to be welded at a precise distance; and as a matter of fact, the width of the gap is continuously varying. Therefore, change in the length of the extension of the electrode is unavoidable; and in turn, the amount of resistance heating at this portion, and thus, the melting speed of the electrode wire inherently varies. Full-automatic welding experiences similar variations. In the case where the electrode 1 is oscillated during welding, the cyclical changes in the extension of the electrode may be similar to the case above mentioned, depending upon the condition of the object to be welded or upon the setup of the oscillating mechanism, which results in the variation of the electrode melting speed. Further, the shortcircuiting time ratio $\eta$ will, as a rule, vary within the range of 5 to 60 percent in the case of the shortcircuit metal transfer arc welding. By way of example, if the feeding speed of the electrode wire is too fast the electrode would impinge upon the molten pool, thus taking a long time before it is fused off, and would result in lengthy shortcircuiting time and accordingly, $\eta$ (i.e., the ratio of the shortcircuiting time to the total time of the shortcircuiting cycle T) would increase. Conversely, if the feeding speed of the electrode has become too slow, the arc-on time would be lengthened, thus resulting in the smaller value of the ratio.

Through the analyses as described above, it may be concluded that the two factors out of the four mentioned above, i.e., the resistance $r_e$ and the shortcircuiting time ratio $\eta$, remain as the problems to be discussed in connection with the conventional controlling system which depends upon the welding power source of substantially-constant potential characteristic and the fixed feeding speed of the welding electrode wire. In determining the electrode melting energy $Pm$, the shortcircuiting time ratio $\eta$ is variable, and the resistance $r_e$ of the extended portion of the electrode is a parameter. It is assumed that $Eo$, $Ea$ and $R$ are constant, while $r_p = O$ and $Pm$ is to be calculated in the extreme cases for $L = O$ and $L = \alpha$. The calculating operation follow:

(I) In the case of no-inductance ($L = O$):

$$i_a = \frac{Eo - Ea}{R + r_e}; \quad i_s = \frac{Eo}{R + r_e}$$

$$Pa = \frac{E_M}{T}\int_0^{T(1-\eta)} i_a \cdot dt = \frac{Eo - Ea}{R + r_e} \cdot E_M(1-\eta)$$

$$Pr = \frac{r_e}{T}\left(\int_0^{T\eta} i_s^2 \cdot dt + \int_0^{T(1-\eta)} i_a^2 \cdot dt\right)$$

$$= r_e\left\{\left(\frac{Eo}{R+r_e}\right)^2 \eta + \left(\frac{Eo-Ea}{R+r_e}\right)^2 \cdot (1-\eta)\right\}$$

$$Pm = Pa + Pr$$

(II) In the case of infinite inductance ($L = \alpha$):
$i_a = i_s = [Eo - (1-\eta)\cdot Ea]/(R + r_e)$
$Pa = [Eo - (1-\eta)\cdot Ea]/(R + r_e)\cdot E_M \cdot (1-\eta)$
$Pr = r_e [Eo - (1-\eta)\cdot Ea]/(R + r_e)^2$
$Pm = Pa + Pr$ In the case where the above equations are implemented by subsituting such exemplary numerical values for the respective sumbols as:

$Eo = 22$ V; $Ea = 20$ V; $R = 0.02$ $\omega$; $E_M = 4$ V; $r_e = 0.01$ $\omega$ and $r_e = 0.001$ $\omega$;

the relation between $Pm$ and $\eta$ can be obtained and plotted into graphs as shown in FIG. 4. As will be clearly seen from FIG. 4, when the resistance $r_e$ of the extended portion of the electrode is large, the electrode melting energy $Pm$ increases or decreases in direct accordance with the increase or decrease in the shortcircuiting time ratio $\eta$, but conversely, when $r_e$ (i.e., the resistance of the extended portion of the electrode) is small, the energy $Pm$ will decrease as the shortcircuiting time ratio increased. However, the resistance $r_e$ of the extended portion of the electrode and the short-circuiting time ratio are prone to vary irregularly, as stated in the foregoing, so that the melting energy is not always readily determinable. Assuming that the shortcircuiting time ratio $\eta$ has changed the melting energy is not definitely determinable in direct accordance with the change in the value of $\eta$, possibly due to the condition of the extended portion of the electrode. Therefore, in such a case if the speed of the feed of the welding electrode 1 is fixed, as exemplified by the straight line $Sf$ in FIGS. 5 (a) and (b), according to the conventional control system, uncalled for melting will result. By way of example, if the resistance $r_e$ of the electrode extended portion is high when the shortcircuiting time ratio increases, the melting energy will increase as shown in FIG. 5 (a) and the electrode melting speed will accordingly become higher than the electrode feeding speed. In this case, the welding would therefore go on steadily at this stage. However, if the resistance $r_e$ is low when the shortcircuiting time ratio increases, the melting energy used to fuse the electrode will be small as shown in FIG. 5 (b) even though the electrode 1 impinges upon the molten pool 3, finally further increasing the shortcircuiting time ratio $\eta$. As a result, the shortcircuit metal transfer arc welding will fall into an extremely unstable state and the welding operation will be sometimes hampered. It may be concluded from the above that, in the shortcircuit metal transfer arc welding, so long as it is impossible to preclude variations in the length of the extended portion of the electrode, the use of the conventional control system in which the electrode 1 is fed at a fixed speed would inevitably cause extremely unstable welding conditions, because of the irregular variations in the length of the extended portion of the electrode; and in some extreme cases the welding process would become inoperative.

In FIGS. 5 (a) and (b), the melting energy $Pm$ is plotted in a straight line, but in actual practice, the melting energy $Pm$ would follow a path as shown in FIG. 5 (c). In other words, until the increase of shortcircuiting time ratio $\eta$ reaches a certain value, the melting energy will keep on increasing; but once the time ratio $\eta$ has surpassed this value, experience has shown that then $Pm$ will gradually decrease. As referred to in the foregoing, in order to maintain shortcircuit metal transfer arc welding in a stabilized condition, it is necessary that, as the shortcircuit time ratio increases, the melting energy increases accordingly. Examining FIG. 5 (c), it will be clearly understood that the range within which stabilized welding can be performed is extremely small when the welding electrode is fed at a fixed speed. As a practical matter, it is almost impossible to preclude all the variations in the welding electrode extension length during the course of a welding operation. It follows that such an arrangement must ensure that the electrode melting energy increases or decreases in direct accordance with the increase or decrease in the shortcircuiting time ratio $\eta$, regardless of whatever the condition of the electrode extension length may be.

According to the present invention, there is provided a shortcircuit transfer arc welding apparatus for applying shortcircuit welds to a base metal including a welding electrode, means for supplying a substantially constant voltage and thereby establishing a welding arc between said welding electrode and said base metal to be welded and means for feeding said welding electrode toward a weld zone on said base metal, means connected to said base metal and said welding electrode for detecting the ratio between the arc-on time to the sum of the shortcircuiting and arc-on times and thereby generating a signal representative of said ratio, and means responsive to said detecting means for controlling said feeding speed of said electrode feeding means in accordance with said ratio signal.

According to the present invention, there is further provided a method of controlling the feeding of a welding electrode in a shortcircuit transfer arc welding apparatus which apparatus comprises a welding electrode, a source for supplying a substantially constant voltage and thereby establishing a welding arc between said electrode and a base metal to be welded, and means for feeding said welding electrode toward a weld zone on said base metal, comprising the steps of detecting the ratio of the arc-on time to the sum of the shortcircuiting and arc-on time, generating a signal representative of said ratio, and maintaining the feeding speed of said electrode in proportion to said ratio signal.

Figure 6:
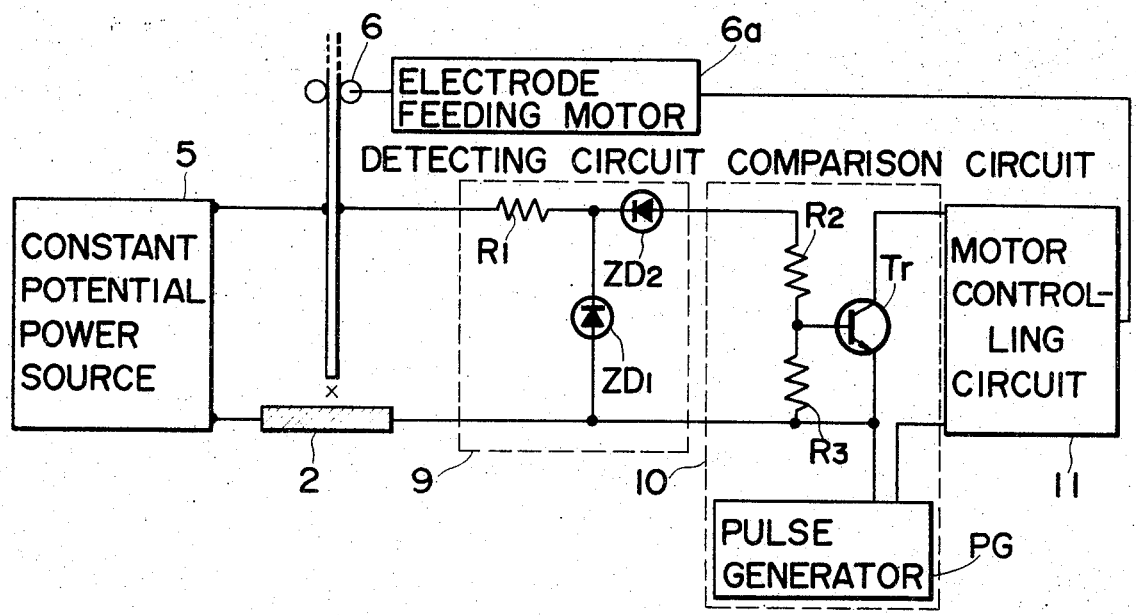

A preferred embodiment of the present invention will now be described by way of example with reference to the accompanying drawings already described and the following drawing in which;

FIG. 6 is a circuit diagram showing one preferred embodiment of the system according to the present invention which is utilized in shortcircuit metal transfer arc welding.

In describing the preferred embodiment of the present invention illustrated in the drawing, specific terminology will be resorted to for the sake of clarity.

Various methods for controlling the electrode feeding speed in response to the shortcircuiting time ratio or the arc-on time ratio $(1-\eta)$, namely, the melting speed, are possible. Some of them are : (1) a method in which the initiating and terminating phases of shortcircuiting time or arc-igniting time are detected to operate a switching device by which the electrode feeding motor is driven by the output voltage regulated by the switching device in response to those phases and (2) a method in which the output voltage of the welding power source is detected, so that the feeding speed of the electrode wire can be controlled in response to the detected value of the output voltage of said power source.

In either of these methods, it is necessary to render the electrode feeding speed to be accurately proportional to the arc-on time ratio. Accordingly, to perform the present invention requires the detection of the accurate arc-on time which begins from arc ignition and ends at arc extinction to make it possible to drive the electrode feeding motor at a speed accurately proportional to this arc-on time.

Generally, in shortcircuit metal transfer arc welding, since it can be deemed that the arc voltage during arcing is constant, the latter method is such that the electrode feeding motor is driven in response to the arc-on time ratio. However, since an electrode feeding motor which has been usually employed has an inertia so that, if the latter is excessive, the motor will continue to rotate for a certain period even during a period in which the electrode is shortcircuited with the base metal and, therefore, the electrode is fed toward a weld zone on the base metal for that period of time, this latter method can not be employed in the control system of the present invention wherein the arrangement is such that the electrode feeding speed is accurately proportionated on the arc-on time ratio. Accordingly, to enable the present invention to be accurately performed, a pulse motor which can be electrically accurately controlled and which has a relatively lower inertia should be used for the electrode feeding motor.

In FIG. 6, one embodiment of the present invention is shown which is effective to accurately detect the arc-on time so that the electrode feeding motor which has a relatively low inertia can be driven during this period thereby to feed the electrode in proportion to the arc-on time ratio.

Referring now to FIG. 6, a welding power source 5 has one terminal connected with an electrode 1 and the other terminal connected with a workpiece 2 to be welded. The electrode 1 is adapted to be fed by an electrode feeding means 6 such as a pair of feed rolls connected to an electrode feeding motor 6a. Power from the welding power source 5 which has an external characteristic of substantially constant potential is employed to establish an arc between the electrode tip and the base metal 2. A detecting circuit 9 is adapted to detect the initiating and terminating phases of arc-on time and includes a first Zener diode $ZD_1$, and a series circuit consisting of a resistor $R_1$ and a second Zener diode $ZD_2$ of which the cathode is connected with the adjacent end of the resistor $R_1$. In this detecting circuit 9, the other end of the resistor $R_1$ is connected with the electrode 1 and the first Zener diode $ZD_1$ has its cathode connected with the junction point between the resistor $R_1$ and the second Zener diode $ZD_2$ and its anode connected with the base metal 2. It is to be noted here that the Zener voltage of the Zener diode $ZD_1$ is so selected as to be higher than that of the Zener diode $ZD_2$ and to be lower than the arc voltage generated during the arc-on period, and that the Zener voltage of the Zener diode $ZD_2$ is so selected as to be higher than the voltage present between the electrode 1 and the base metal 2 during the shortcircuit period to prevent such voltage from being impressed on the circuit 10 during the same period. Accordingly, the detecting circuit 9 can detect the initiation and termination (extinction) of the arc-on period, the output voltage of said detecting circuit 9 being of a rectangular waveform and equal or substantially equal to the difference between the Zener voltages of the Zener diodes $ZD_1$ and $ZD_2$, said difference being within the voltage present between the electrode 1 and the base metal 2 during the arc-on period.

A circuit 10 includes a switching means in the forms of a transistor $Tr$ and a pulse generator PG of any commercially available model in which the generating frequency is variable within the range of about 10 to 8,000 PPS. The circuit 10 further includes a resistor $R_2$ having one end connected with anode of the second Zener diode $ZD_2$ of the detecting circuit 9 and the other end connected in series with the adjacent end of a resistor $R_3$ of which the other end is connected in shunt with the base metal 2 and with the emitter of the transistor $Tr$. The junction point between the both resistor $R_2$ and $R_3$ is connected with the base of the transistor $Tr$, the collector of the latter being connected with a corresponding terminal of a motor controlling circuit 11. The pulse generator PG has one terminal connected with the emitter of the transistor $Tr$ and the other terminal connected with the other terminal of the motor controlling circuit 11. The output of this circuit 10 is supplied as an input to the motor controlling circuit 11, and in turn the output of the controlling circuit 11 can be applied to the electrode feeding motor 6a.

In the above said circuit, it will be clearly understood that the voltage of the value substantially equal to the difference in the Zener voltages of Zener diodes $ZD_1$ and $ZD_2$ can be applied from the detecting circuit 9 to the circuit 11 so as to bring the transistor $Tr$ into the conductive state only during a period defined between the moments of arc-ignition and of arc-extinction. On the other hand, when the output voltage of the detecting circuit 9 drops to the zero value during the shortcircuiting period, the transistor $Tr$ will be brought into the non-conductive state. However, since the pulse generator PG is constantly operated so as to generate therefrom pulses of predetermined frequency the pulses can be applied to the control circuit 11 only when the transistor $Tr$ is brought into the conductive state i.e., during the arc-on period, and hence, the motor 6a rotates at a speed directly proportional to the frequency of the pulses that are produced by the pulse generator PG, thereby feeding the welding electrode. During the shortcircuiting period, the pulses are not impressed on the controlling circuit 11, and the motor 6a does not rotate. However, it is to be noted that the electrode feeding motor 6a may be preferably in the form of a pulse or step motor which may have an output of 0.05 to 0.46 HP with the maximum follow-up pulse speed of 6,000 to 8,000 PPS. Accordingly, the motor 6a can, by its intrinsic characteristic, make a revolution of one step upon impression of each pulse (ordinarily, angular deflection at one step being 1.5° to 2.25°), and it does not over-run due to the inertia as is commonly the case with an ordinary electric motor. In addition, an excellent response time on the order of 1/8,000 second is obtainable with the step or pulse motor.

As hereinbefore described, it will be understood that, during the period when an arc is present between the welding electrode 1 and the base metal 2, the welding electrode can be fed, whereas during the shortcircuiting period, the electrode feeding motor does not rotate. Thus, the welding electrode feeding speed Sf can be expressed as:

$$Sf \alpha f_p \cdot ( t_a / t_a + t_s ) \alpha f_p \cdot (1 - \eta) = k \cdot (1 - \eta)$$

where:
$f_p$ is the pulse generating frequency and k is a constant of proportionality.

It follows from the above that the feeding speed $Sf$ decreases with decreases of arc-on time ratio $(1 - \eta)$. Thus, it will be clearly seen that the condition as shown in FIG. 5 (d) results and welding may proceed, regularly repeating the alternation of shortcircuiting and arc-on.

In the foregoing preferred embodiment which has been disclosed above, the explanations have proceeded on the assumption that the no-load (open-circuit) voltage $Eo$ of the welding power source has a constant value. However, in actual practice, the no-load voltage $Eo$ of the welding power source may possibly be subjected to variations depending upon the variation in an input voltage to be supplied to the welding power source S. If the conventional control system is adopted, when the electrode will be fed at a constant speed despite the fact that the electrode melting energy Pm varies and thus the electrode feeding speed actually varies and, as a result, the stability of the welding and the operation might be completely ruined. In the control system of the present invention, without such drawbacks or disadvantages, the welding electrode can be fed in direct accordance with the shortcircuiting time ratio or with the arc-on time rate, i.e., the electrode melting rate. By adopting the control system of this invention, there can be realized such advantages that variations in the no-load voltage $Eo$ can be compensated for. Accordingly, the welding and operational factors may be independent of the variations in the input voltage to be supplied to the welding power source. In other words, variations in the supply source voltage are harmless, over a wide range, to factors that are essential to welding according to the present invention.

Having precisely described the operation of the controlling method, it may be concluded that, in the present invention, the electrode feeding speed can be controlled in accordance with the melting rate of the welding electrode. Thus, an accurate, stabilized and regular repetition of the cyclical alternation of the shortcircuiting and the arcing accompanied by the excellent welding, can be obtained and operation is immune from any increase or decrease in the electrode melting or fusion that may result from irregular variations in the length of the electrode extended portion or from the variations in supply source voltage. Besides the advantages enumerated above, as will be clearly understood from the preferred embodiment and examples according to the present invention, shown in the accompanying drawings and in the specification, this controlling method can be practised with an extremely simple construction of circuit.

We claim:

1. A short-circuit metal transfer arc welding apparatus for applying short-circuit welds to a base metal comprising:

a welding electrode;

first means, connected to said welding electrode and to said base metal, for establishing a welding arc between said welding electrode and said base metal by supplying a substantially constant voltage between said base metal and said welding electrode;

a pulse responsive feeding motor, mechanically linked to said welding electrode through electrode feed-roll means, for feeding said welding electrode into regular alternate short-circuit and arcing engagement with said base metal;

detection means comprising a first resistor and a first Zener diode, connected in series between said welding electrode and said base metal, and a second Zener diode, connected to the junction point of said first Zener diode and said first resistor, for detecting an arc-on period of said arc, said arc-on period extending from the moment of arc ignition to the moment of arc extinction, said detection means producing an output voltage during said arc-on period;

pulse means for generating pulses having a prescribed duration;

switching means comprising second and third resistors connected in series, across one end of said second Zener diode and one end of said first Zener diode, a transistor having a base, an emitter, and a collector, the base of said transistor being connected to the junction of said second and third resistors, while the emitter of said transistor is connected to said third resistor, and said pulse means being connected to the emitter of said transistor, said switching means causing said pulses, generated by said pulse means, to be switched therethrough during the arc-on period in response to said output voltage of said detection means; and means, responsive to the pulses switched through said switching means, for energizing said pulse responsive feeding motor, to feed said welding electrode towards engagement with said base metal.

2. An apparatus according to claim 1, wherein the Zener voltage of said first Zener diode is higher than the Zener voltage of said second Zener diode, and is lower than the arc voltage generated during said arc-on period, while the Zener voltage of said second Zener diode is higher than the voltage between said welding electrode and said base metal during the short-circuit period.

* * * * *